US010198270B2

(12) United States Patent
Cooper et al.

(10) Patent No.: US 10,198,270 B2
(45) Date of Patent: Feb. 5, 2019

(54) DYNAMIC HARDWARE CONFIGURATION VIA FIRMWARE INTERFACE AT COMPUTING DEVICE BOOT

(71) Applicant: Lenovo Enterprise Solutions (Singapore) PTE. LTD., New Tech Park (SG)

(72) Inventors: Ralph Saul Cooper, Durham, NC (US); Michael Charles Elles, Apex, NC (US); Robert Anthony Fenoglio, Raleigh, NC (US); Paul Klustaitis, Durham, NC (US); Luis Rene Quinones Supelveda, Raleigh, NC (US); Jeffrey B. Williams, Raleigh, NC (US)

(73) Assignee: Lenovo Enterprise Solutions (Singapore) PTE. LTD., New Tech Park (SG)

(*) Notice: Subject to any disclaimer, the term of this patent is extended or adjusted under 35 U.S.C. 154(b) by 109 days.

(21) Appl. No.: 15/410,163

(22) Filed: Jan. 19, 2017

(65) Prior Publication Data
US 2018/0203705 A1    Jul. 19, 2018

(51) Int. Cl.
*G06F 9/44* (2018.01)
*G06F 9/4401* (2018.01)
(52) U.S. Cl.
CPC .................. *G06F 9/4401* (2013.01)
(58) Field of Classification Search
CPC .................................................. G06F 9/4401
See application file for complete search history.

(56) References Cited

U.S. PATENT DOCUMENTS

| | | | | | |
|---|---|---|---|---|---|
| 5,974,546 | A | * | 10/1999 | Anderson | G06F 11/2284 713/2 |
| 2007/0174704 | A1 | * | 7/2007 | Shih | G06F 11/3664 714/36 |
| 2017/0199776 | A1 | * | 7/2017 | Dasar | G06F 11/079 |

OTHER PUBLICATIONS

"Disable Hardware on SPARC Platforms from the OBP", Blog O'Matty, online <http://prefetch.net/blog/index.php/2008/07/25/disable-hardware-from-sparc-platforms-at-the-obp/>, Jul. 25, 2008, 5 pp.
"In Windows, what is Safe Mode used for and why?" dated Feb. 19, 2001. HowStuffWorks.com. <http://computer.howstuffworks.com/question575.htm> accessed Jan. 19, 2017.

* cited by examiner

*Primary Examiner* — Stefan Stoynov
(74) *Attorney, Agent, or Firm* — Jason Friday

(57) ABSTRACT

At initiation of boot of a computing device, a processor executes a firmware interface of the computing device, like a basic input/output system (BIOS) or a unified extended firmware interface (UEFI). The processor executes the firmware interface to detect whether a dynamic hardware configuration (DHC) function has been enabled. In response to detecting that the DHC function has been enabled, the processor executes the firmware interface to configure hardware components of the computing device according to a DHC, such as to selectively disable the hardware components. After configuring the hardware components according to the DHC, the processor proceeds to boot the computing device.

17 Claims, 5 Drawing Sheets

DYNAMIC HARDWARE CONFIGURATION VIA FIRMWARE INTERFACE AT COMPUTING DEVICE BOOT

BACKGROUND

A modern computing device is in actuality a collection of many hardware components that operate in concert to perform functionality colloquially ascribed to "the computer." For instance, a computing device can include a mainboard, which is the primary circuit board of the device. A processor, such as a central processing unit (CPU) of the computing device, is connected to the mainboard, either in a permanent manner by soldering or in a removable manner via insertion into a socket or connection to a connector on the mainboard. Other hardware components are also connected to the mainboard permanently or removably. Such other hardware components can include memory, storage device interfaces, storage devices, network adapters, display adapters, and so on.

SUMMARY

An example computer-readable data storage medium that is not a transitory signal stores a firmware interface that a processor of a computing device executes. The processor executes the firmware interface to, at initiation of boot of a computing device, detect whether a dynamic hardware configuration (DHC) function has been enabled. The processor executes the firmware interface to, in response to detecting that the DHC function has been enabled, configure hardware components of the computing device according to a DHC. The processor executes the firmware interface to, after configuring the hardware components according to the DHC, boot the computing device.

An example computing device includes a mainboard, and a processor connected to the mainboard. The computing device includes of hardware components, other than the processor, connected to the mainboard. The computing device includes a non-volatile memory of the mainboard storing a firmware interface that is executable by the processor. The processor is to execute the firmware interface to at initiation of boot of the computing device, detect whether a DHC function has been enabled. The processor is to execute the firmware interface to, in response to detecting that the DHC function has been enabled, configure the hardware components according to a DHC. The processor is to execute the firmware interface to, after configuring the hardware components according to the DHC, boot the computing device.

An example method includes enabling a DHC function of a computing device. The method includes, after enabling the DHC function, initiating boot of the computing device. At initiation of the boot of the computing device, a processor of the computing device executes a firmware interface, detects that the DHC function has been enabled, and responsively configure hardware components of the computing device according to a DHC, and then boot the computing device.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
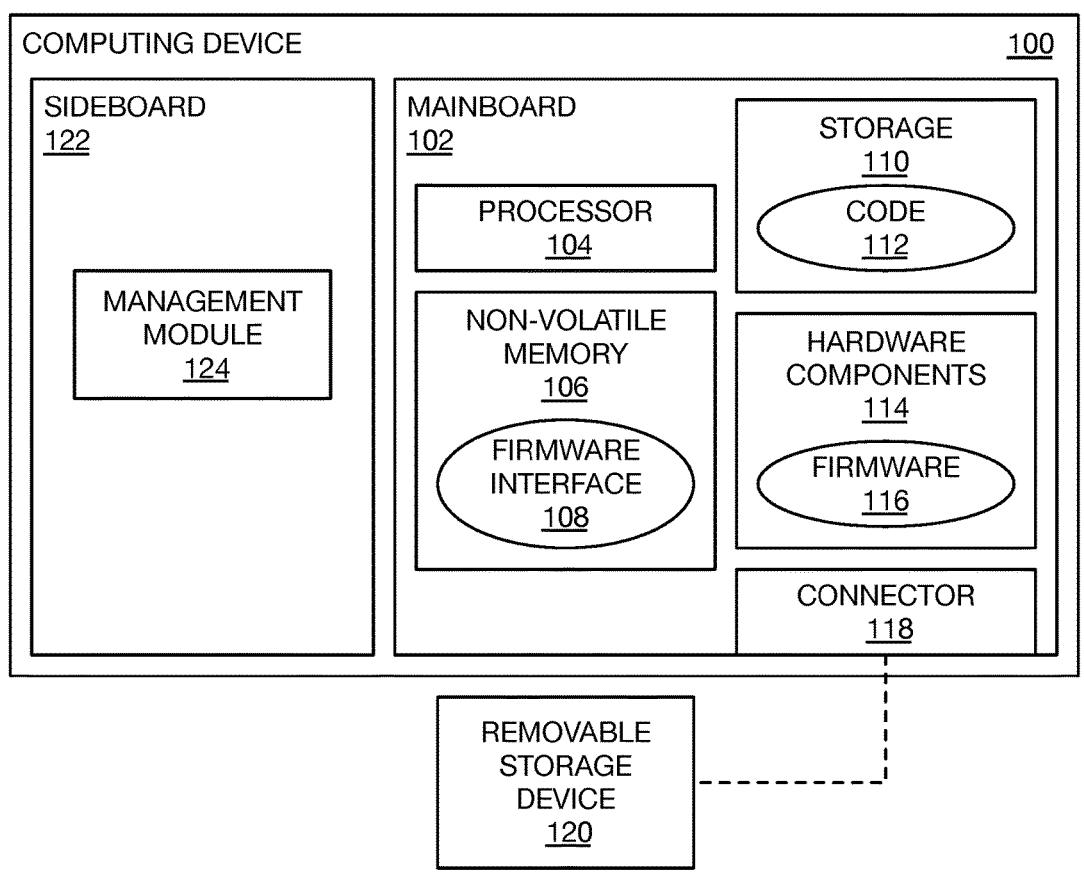
FIG. 1 is a diagram of an example computing device having a firmware interface that can perform dynamic hardware configuration (DHC) at pre-boot.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, what is commonly considered a computing device, like a computer such as a desktop computer, server, or laptop or notebook computer, is in actuality a collection of hardware components that operate in unison to realize the functionality of the device. Turning on a computing device, or causing the computing device to reset, results in booting of the computing device. Successfully booting a computing device means that an operating system is started on the computing device, in conjunction with which other computer programs can then be manually or automatically started. However, prior to starting, or loading, the operating system, many types of computing devices perform (pre-)boot activities.

Specifically, at initiation of boot of a computing device, including turning on the computing device or resetting the computing device, the processor initially executes a firmware interface. Examples of firmware interfaces including the basic input/output system (BIOS) and the unified extensible firmware interface (UEFI). In common usage it is said that the BIOS or UEFI, for instance, performs functions, but in actuality the primary processor of the computing—e.g., its central processing unit (CPU)—executes the firmware interface to perform them. The firmware interface is stored within a type of read-only memory (ROM) disposed on a mainboard of the computing device, such as an electronically erasable ROM (EEROM), a programmable ROM (PROM), or flash memory. Initial execution of the firmware interface at pre-boot may occur by an execute-in-place (XIP) technique, in which an internal cache of the processor, such as level two (L2) cache, is employed as if it were (external) random-access memory (RAM).

During such pre-boot of the computing device (i.e., prior to starting the operating system), the processor executes the firmware interface to perform boot services, which initialize the hardware components of the computing device, prior to the firmware interface starting and passing control to the operating system. In certain types of boot initiation, such as when the computing device has been cold-booted (e.g., power has been removed from the device and then applied, such as by turning off and then on the device), the firmware interface may first perform a power-on self test (POST). POST performs rudimentary diagnostic testing on the hardware components of the device. Once the hardware components have been initiated, the firmware interface then turns control over to the operating system, by loading or otherwise starting the operating system. The firmware interface still is operational, insofar as the interface provides runtime services (as compared to the boot services performed prior to starting the operating system) by which the operating system accesses the hardware components through firmware of these components. However, control of the computing device effectively transfers from the firmware interface to the operating system.

If a hardware component has failed, or has been configured improperly, initialization of the component may result in the computing device hanging. The firmware interface thus does not pass control to the operating system. Stated another way, the computing device ceases to actually boot after boot has been initiated, because the operating system is never loaded. In some cases, the firmware interface may be visually inaccessible to a user via a display device connected to the computing device, because the display hardware of the computing device may have failed, or because the display hardware may not yet have been initialized. The end result is an unusable computing device. The display device may remain blank, or may display just some initial results of the firmware interface's initialization activities. The firmware interface and the computing device itself are unresponsive, at least in effect.

This situation is not easily rectified. If the computing device instead were to hang after loading the operating system, by comparison, then the operating system might be forcible into a diagnostic or "safe" mode in which hardware components are disabled, so that the user can subsequently perform troubleshooting via an interface provided by the operating system. However, when the operating system cannot even load, this and similar types of diagnostic tools are unavailable. A user is left with the option of having to physically remove hardware components from the computing device, in an attempt to identify and isolate which component has failed or otherwise is not permitting the firmware interface from completing its boot services and passing control to the operating system. For hardware that is permanently attached to the mainboard of a computing device, physical removal may indeed be impossible, potentially requiring the user to resort to destructively severing physical connection of a hardware component to power in an attempt to disable the component.

Techniques described herein ameliorate these shortcomings. The firmware interface of a computing device is provided with a dynamic hardware configuration (DHC) function. If enabled, at subsequent initiation of boot of the computing device, the firmware interface causes the processor to configure the hardware components of the device according to a user-specified or automatically determined DHC. For instance, one or more hardware components may be selectively disabled, or certain functionality of such hardware components may be turned off. The processor then continues with the remainder of the pre-boot services under control of the firmware interface, actually booting the computing device by, for instance, loading and starting an operating system from a startup, or boot, storage device.

As such, if a computing device is not successfully booting under its default hardware configuration, the DHC function can be enabled to provide a DHC that may permit the device to boot, without requiring the user to physically remove or otherwise physically disable hardware components of the computing device. The firmware interface may be programmed to automatically enable the DHC function after a number of consecutive unsuccessful boots have occurred. In this case, the firmware interface may select hardware components to disable, which are disabled one-by-one individually or cumulatively over successive boot attempts of the computing device until the device has successfully boot.

The user may manually enable the DHC function. For instance, the user may interact with a sideboard of the computing device, such as a baseboard management controller (BMC), integrated management module (IMM), or service processor (SP), to enable the DHC function. The firmware interface may then automatically select hardware components to disable as above. As another example, the user may connect a removable storage device, like a universal serial bus (USB) thumb drive, to a physical connector of the computing device. Under direction of the firmware interface, the processor of the computing device detects the presence of storage device, and detects whether the storage device stores data representing a signature corresponding to DHC enablement. The storage device may also store a user-specified DHC according to which the hardware components of the computing device are to be configured.

FIG. 1 shows an example computing device 100. The computing device 100 may be a server computing device, or server. The computing device 100 may be another type of computing device as well, such as a desktop or a laptop computer. The computing device 100 includes a mainboard 102, which may also be referred to as a motherboard or a primary board. The mainboard 102 is the primary logic circuit board of the computing device 100, which includes electrical components and electrical connections, such as traces, interconnecting permanently attached (such as soldered) hardware of the device 100 and/or physical connectors like sockets to which hardware of the computing device 100 is attached.

For instance, as depicted in FIG. 1, a processor 104 is physically connected to the mainboard 102. The processor 104 is the CPU of the computing device 100. Non-volatile memory 106, such as an EEROM or a PROM, is also physically connected to the mainboard 102. The non-volatile memory 106 stores a firmware interface 108 of the computing device 100, which is computer-executable code. As has been described, the firmware interface 108 may be a BIOS or a UEFI.

A physical non-volatile storage 110, such as a hard disk drive or a solid-state drive (SSD) may also be connected to the mainboard 102. When present, the storage 110 stores computer-executable code 112 that can include the operating system of the computing device 100, as well as application programs that run on the operating system. In another implementation, the computing device 100 has an operating system that is not stored at a local storage device like the storage 110. Rather, the operating system may be located on a network, including a storage-area network (SAN), to which the computing device 100 is communicatively connected. As such, the computing device 100 is said to be network booted, in that the operating system does not reside on local storage of the computing device 100 but rather loads from a storage device over a network.

The computing device 100 includes hardware components 114 that are physically attached to the mainboard 102, or attached to corresponding connectors of the mainboard 102. The nomenclature "a hardware component 114, the hardware component 114, or each hardware component 114" is used to refer to one of the hardware components 114. The hardware components 114 can include display hardware, such as graphics or display adapters, as well as network adapters, such as network cards, sound hardware like sound cards, and so on. The hardware components 114 can include the core logic chipset of the computing device 100, such as the northbridge and southbridge chips, if the core logic is not part of the die of the processor 104 itself. Other examples of logic chipsets include a memory controller hub (MCH), a platform controller hub (PCH), a fusion controller hub (FCH), and an input/output controller hub (ICH).

In general, the core logic chipset controls memory of the computing device 100, such as dual-inline memory modules (DIMMs) connected to the mainboard 102 or other such physical random-access memory (RAM) that may be permanently or removably attached to the mainboard 102. The core logic chipset further controls input/output (I/O) of the computing device, interfacing the processor 104 with peripherals including storage devices over one or more buses, such as versions of the universal serial bus (USB), the peripheral component interconnect express (PCIe) bus, and so on. The memory of the computing device 100, as well as the controllers for the memory and for the buses, are other examples of hardware components 114 of the device 100.

Each hardware component 114 itself can include firmware 116, or microcode, which is computer-executable code programmed or embedded within a hardware component 114 by which the component 114 is accessed by the computing device 100, such as when the operating system of the device 100 is running. The firmware 116 of a hardware component 114 may be upgradable to different versions and may be configurable so that different functionality of the component 114 can be selectively enabled or disabled. The firmware 116 can include what are referred to as option ROMs that store a part of the firmware 116 that the firmware interface 108 executes while performing boot services at pre-boot. Unlike the part of the firmware 116 by which a hardware component 114 is accessed after boot, the firmware 116 in the form of an option ROM for the component 114 is a part of the firmware 116 accessed at pre-boot, to initialize the component 114.

For example, an option ROM can store the part of the firmware 116 that permits display hardware to initialize. An option ROM can store the part of the firmware 116 that permits storage device interfaces to extend the types of storage devices from which the computing device 100 can boot (i.e., from which the operating system can be loaded and run). In this respect, an option ROM can provide for network boot of the computing device, via a network interface of the computing device 100. There can be option ROMs corresponding to different types of firmware interfaces 108 present within the computing device 100, such that one option ROM is used for a legacy BIOS that is the firmware interface 108, whereas corresponds to a more modern UEFI being the firmware interface 108.

The computing device 100 can also include one or more externally accessible physical connectors, or ports, including a physical connector 118, such as a USB connector, to which a removable storage device 120 is connectable. The removable storage device 120 may be an SSD, or flash memory. The removable storage device 120 can store a signature corresponding to enablement of the DHC function, and can further store a DHC, as described later in the detailed description.

The computing device 100 may include a sideboard 122, which is a physically or at least logically separate logic board from the mainboard 102 of the device 100. The sideboard 122 stores a management module 124, such as an IMM, a BMC, and/or a SP. The management module 124 permits out-of-band management of the computing device 100, regardless of whether the operating system of the device 100 is running or even present. Thus, the management module 124 can restart the computing device 100 by rebooting the device 100, and once the device 100 is running (in that its operating system is running), can monitor the computing device 100 without involving the processor 104 of the mainboard 102 or the operating system of the device 100.

Figure 2:
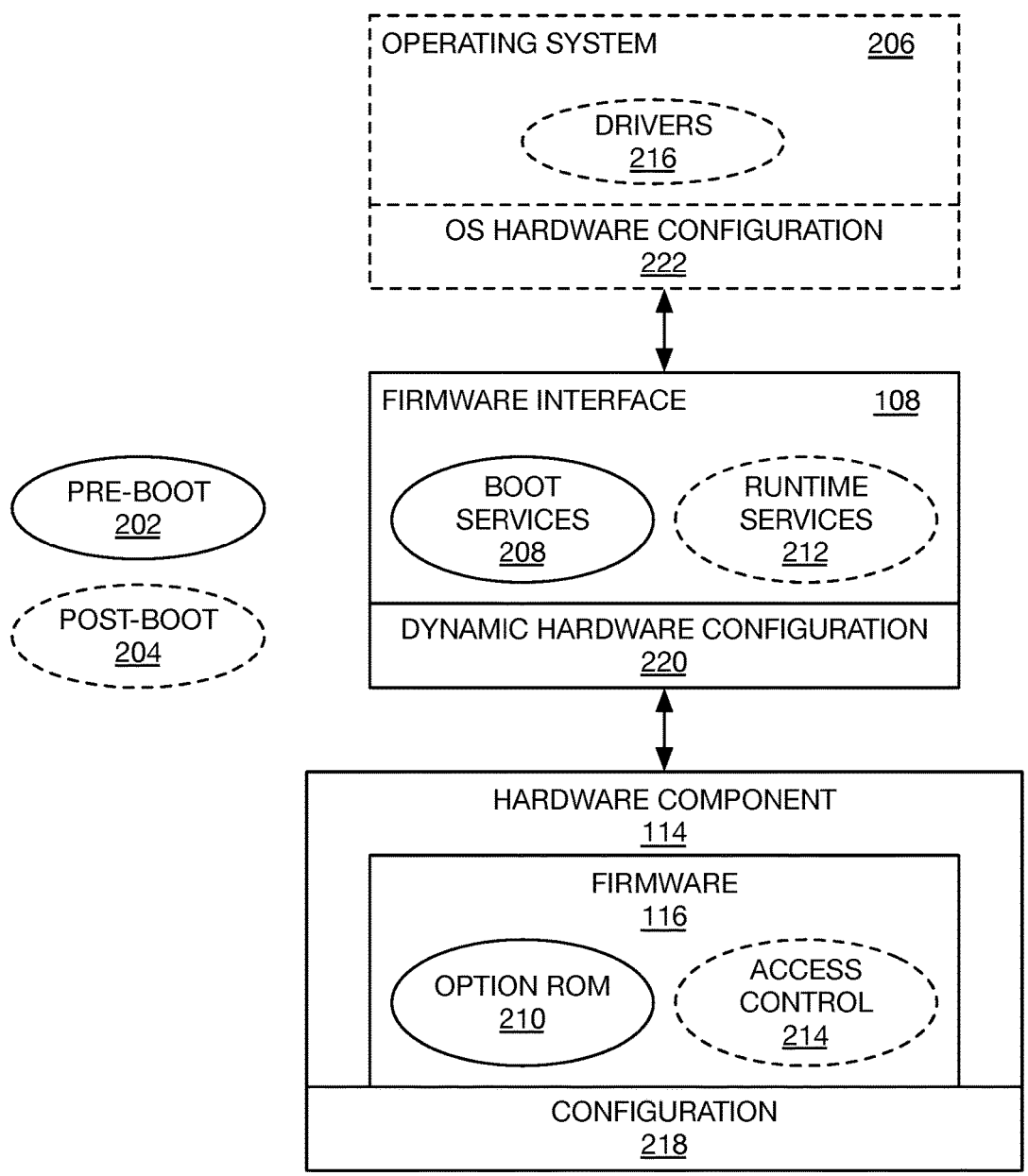
FIG. 2 is a diagram of example interaction among a firmware interface, a hardware component, and an operating system of a computing device.

FIG. 2 depicts example interaction among the firmware interface 108, the firmware 116 of a hardware component 114, and an operating system 206 of the computing device 100 of FIG. 1. Solid and dashed lines in FIG. 2 indicate whether components execute at pre-boot 202 of the computing device 100 or at post-boot 204 of the computing device 100. Thus, boot services 208 of the firmware interface 108 and an option ROM 210 of the firmware 116 run just at pre-boot 202, whereas runtime services 212 of the firmware interface 108 and access control 214 of the firmware 116 run just at post-boot 204. The operating system 206, including its drivers 216, runs just at post-boot 204.

When boot of the computing device 100 of FIG. 1 is initiated, the processor 104 executes the firmware interface 108 during pre-boot 202, performing the boot services 208 of the firmware interface 108. During pre-boot 202, the firmware interface 108 detects whether a DHC function has been enabled. If the DHC function has been enabled, the firmware interface 108 configures the hardware component 114, via its firmware 116, according to a DHC 220 that specifies the configuration for one or more of the hardware components 114 of the computing device 100. The DHC 220 may at a coarse level indicate whether the hardware component 114 depicted in FIG. 2 has been disabled. At a more granular level, the DHC 220 may specify which option ROM 210 is enabled if there are multiple option ROMs 210 for the hardware component 114. At an even more granular level, the DHC 220 may enable or disable individual functionality of the hardware component 114, by changing the configuration 218 of the hardware component 114 accessible through the firmware 116.

The firmware interface 108 (i.e., as executed by the processor 104) continues with pre-boot 202 by initializing the hardware components 114. If the DHC function has not been enabled, then the firmware interface 108 may initialize every hardware component 114. However, if the DHC function has been enabled, then the firmware interface 108 will not initialize any hardware component 114 that has been disabled in the computing device-wide DHC 220.

Initialization of a hardware component 114 can differ on a hardware component-by-hardware component basis. At a minimum, a hardware component 114 may execute its firmware 116 to start up the component 114, so that the component 114 is ready to perform its functionality (e.g., information display in the case of display hardware, network communication in the case of a network adapter, and so on) when control passes to the operating system 206. The firmware 116 of a hardware component 114 like a storage device interface or a network interface may at initialization extend the inherent capabilities of the firmware interface 108 as to how the computing device 100 can boot in terms of the location from which the operating system 206 is loaded.

If the firmware 116 of a hardware component 114 includes a part in the form of an option ROM 210, the code stored on the option ROM 210 can control initialization of the hardware component 114. If there are multiple option ROMs 210 for the hardware component 114, then one is enabled and others are disabled. The DHC 220 may specify which option ROM 210 is enabled, such that the firmware interface 108 calls the enabled option ROM 210 specified in the DHC 220. If the DHC function has not been enabled, though, then the option ROM 210 most recently used may control initialization of the hardware component 114.

The firmware 116 of a hardware component 114 further initializes the hardware component 114 according to the configuration 218 of the component 114 specified by the firmware 116. The configuration 218 can include particular settings for parameters of the hardware component 114, as well as indicate whether different functionality of the component 114 have been selectively disabled or not. As a concrete example, a network interface or adapter may have wake on local-area network (WoL) functionality that may be enabled or disabled at the hardware level. If the DHC function has been enabled, then the firmware interface 108 may change the configuration 218 of the hardware component 114, through the firmware 116, prior to initialization of the component 114 by the firmware 116, in accordance with the DHC 220. If the DHC function has not been enabled, the current settings of the configuration 218 are used during initialization without the firmware interface 108 changing them.

Once every hardware component 114 that has not been disabled, such as according to the DHC 220 if the DHC function has been enabled, has been enabled, the firmware interface 108 continues with the boot services 208 to boot the computing device 100 of FIG. 1. Booting the computing device 100 includes loading and starting the operating system 206. The boot services 208 of the firmware interface 108 specify an order in which locations are checked for a valid operating system 206 that can be loaded. For example, if network boot has been enabled by a network interface and is first in the order, then the firmware interface 108 may attempt to load and start an operating system 206 at a location on the network. If the firmware interface 108 is unable to do so, then the interface 108 proceeds to the next location in the boot order or sequence, which may be a particular storage drive.

Ultimately, boot of the computing device 100 is successfully completed when an operating system 206 has started on the computing device 100. Active control of the processor passes from the firmware interface 108 to the operating system 206. When the operating system 206 starts, the operating system 206 may have its own hardware configuration 222 for the hardware components 114. This hardware configuration 222 can provide operating system-specific parameters for the hardware components 114, and can also selectively disable the components 114 regardless if they were previously disabled at the lower, firmware interface level. That is, a hardware component 114 may be disabled within the hardware configuration 222 of the operating system 206, even if the component 114 was enabled (and thus initialized) during pre-boot 202, such as in accordance with the DHC 220.

Once the computing device 100 has successfully booted, the computing device 100 at post-boot 204 continues with the processor 104 of the device 100 running the operating system 206, including loading and running application programs on the operating system 206. The operating system 206 includes drivers 216 for the hardware components 114 by which the operating system 206 accesses the components 114. The drivers are specific to the operating system 206, however, and are not part of the firmware 116 of the hardware components 114. The drivers 216 permit the operating system 206 and computer programs running on the operating system 206 to access the hardware components of the computing device 100.

More specifically, and in actuality, the drivers 216 access the hardware components 114 through runtime services 212 of the firmware interface 108. Therefore, even at post-boot 204, the firmware interface 108 is still considered active in that the interface 108 provides the runtime services 212 for access of the hardware components 114. Similarly, the firmware 116 of each hardware component 114 provides access control 214 to its underlying hardware functionality as can be selectively enabled in accordance with the configuration 218 of the component 114. As such, the runtime services 212 are a (firmware) interface 108 between a driver 216 of the operating system 206 and a hardware component 114 that provides access control 214 to its hardware functionality at post-boot 204 of the computing device 100.

Figure 3:
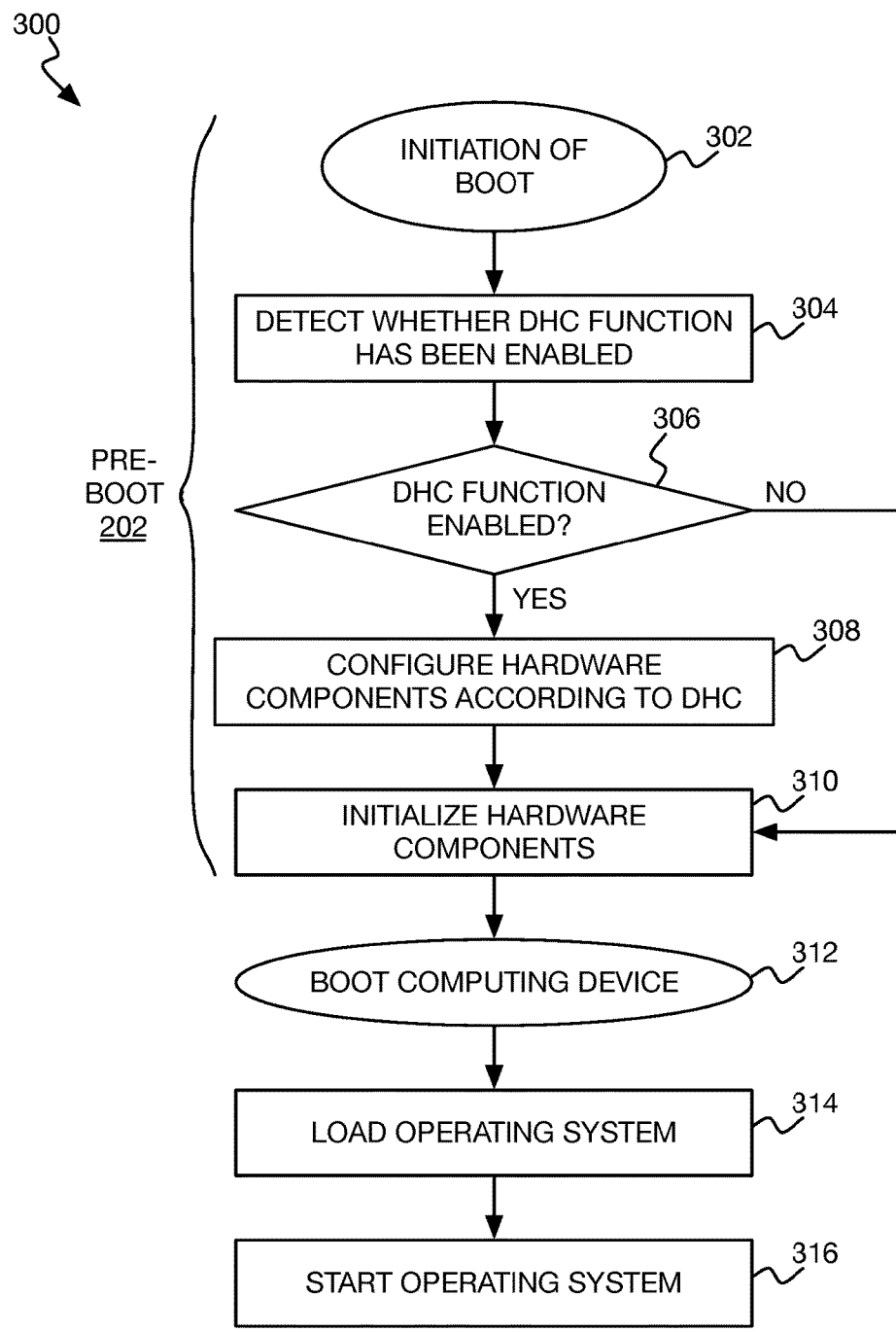
FIG. 3 is a flowchart of a method for booting a computing device, in which DHC can be performed at pre-boot.

FIG. 3 shows an example method 300 of a boot process 300 of the computing device 100. Boot of the computing device 100 is initiated (302). For example, the computing device 100 may be turned on after having been turned off. A user may have reset or have initiated restart of the computing device 100, locally via the operating system 206 or at the firmware interface 108, or remotely through the management module 124 of the computing device 100. Boot initiation results in parts 304, 306, 308, and 310 being performed as part of pre-boot 202 of the computing device 100, in which the processor 104 executes boot services 208 of the firmware interface 108.

The firmware interface 108 detects whether the DHC function has been enabled (304). The DHC function can be enabled at initiation of the user. For example, a user may remotely enable the DHC function through the management module 124 of the computing device 100. In this case, the processor 104 executes the firmware interface 108 to detect whether the user has previously initiated a command via the management module 124 to enable the DHC.

As another example, the user may connect to a corresponding physical connector 118 of the computing device 100 a removable storage device 120 that stores data representing a signature corresponding to DHC function enabled. In this case, the processor 104 executes the firmware interface 108 to first detect whether a removable storage device 120 has been inserted into a corresponding port (i.e., physical connector 118) of the computing device 100. If presence of a removable storage device 120 is detected, the processor 104 than executes the firmware interface 108 to determine whether the storage device 120 stores data representing a signature corresponding to enablement of the DHC function.

For instance, the firmware interface 108 may look for a file of a predetermined filename on the file system of the storage device 120. In some cases, this may sufficiently enable the DHC function. However, in other cases, the firmware interface 108 may perform further authentication. The firmware interface 108 may read the data of the file and compare it to a previously exchanged shared secret between the user and the computing device 100, which may have been generated using a public cryptographic key of the computing device 100 and a private key of the user.

In this example, once the DHC function has been enabled via insertion of a removable storage device 120, the DHC function may or may not remain enabled over consecutive unsuccessful boots of the computing device 100 if the storage device 120 is removed between consecutive boots. In one implementation, then, if the storage device 120 is removed and boot of the computing device 100 is again initiated, then the absence of the storage device 120 is detected and the DHC function is correspondingly disabled. In another implementation, by comparison, if the storage device 120 is removed and boot of the computing device 100 is again initiated, the DHC function remains enabled.

The DHC function can further be initiated automatically. For instance, the firmware interface 108, as executed by the processor 104, may track the number of consecutive times that the computing device 100 has failed to boot successfully. A successful boot is the loading and starting of the operating system 206 on the computing device 100. The firmware interface 108 may store a corresponding counter in the non-volatile memory 106. Each time boot of the computing device 100 is initiated, the firmware interface 108 increments this counter by one. When the operating system 206 is successfully started, the firmware interface 108 may reset the counter to zero. At initiation of boot, therefore, if the counter has reached a predetermined number, then the firmware interface 108 enables the DHC function, and otherwise disables the function.

If the DHC function has been enabled (306), then the processor 104 executes the firmware interface 108 to proceed to configure the hardware components 114 of the computing device 100 according to the DHC 220 (308). Different examples by which the firmware interface 108 may configure the hardware components 114 according to the DHC 220 are described later in the detailed description. The firmware interface 108 proceeds to initialize the hardware components 114 at pre-boot 202 (310), as described above in relation to FIG. 2. If the DHC function was not enabled (306), by comparison, then the firmware interface 108 initializes the hardware components 114 while maintaining the components 114 in a default configuration, as opposed to being (re)configured according to the DHC 220.

The computing device 100, once pre-boot 202 has been completed, is then booted (312). Therefore, the processor 104 executes the firmware interface 108 to load the operating system 206 (314) and then to start the operating system 206 (316). As described, active control of the computing device 100 (i.e., control of the processor 104) transfers from the firmware interface 108 to the operating system 206 at this time.

At any point during pre-boot 202, though, the computing device 100 can potentially hang, prior to loading or starting the operating system 206. The user may thus have to locally or remotely restart the computing device 100. The ability to enable a DHC function to dynamically configure the hardware components 104 of the computing device 100 thus permits a user to identify and isolate the hardware component(s) 104 that may be causing the computing device 100 from successfully booting, even prior to loading and starting of the operating system 206. The DHC function permits a user to effectively perform troubleshooting of the computing device 100 in such situations, without using the operating system 206, which may not even be present and in any case is unable to even be successfully started because the computing device 100 has not exited the pre-boot 202 stage.

In one implementation, during pre-boot 202 the firmware interface 108 maintains two variables in the non-volatile memory 106 of the computing device 100. The first variable is a counter indicating a number of consecutive times boot of the computing device 100 has been initiated without a successful boot of the device 100 occurring when the DHC function has been enabled. In this implementation, at each initiation of boot of the computing device 100, if the DHC function is enabled, then this counter is incremented. Furthermore, once the computing device 100 has successfully booted, such as at successful starting of the operating system 206, then the counter is reset to zero.

The second variable is a pointer to a current hardware component 114 within a sequence of those hardware components 114 that can be disabled when the DHC function is enabled. The user may specify this sequence, for instance, as well as identify which hardware components 114 of the computing device 100 can be disabled when the DHC function is enabled. As such, some hardware components 114 may never be able to be disabled as part of the DHC. Maintaining these two variables in the non-volatile memory 106 of the computing device 100 permits the firmware interface 108 to configure the hardware components 114 according to a DHC 220 in varying ways, examples of which are now described.

Figure 4:
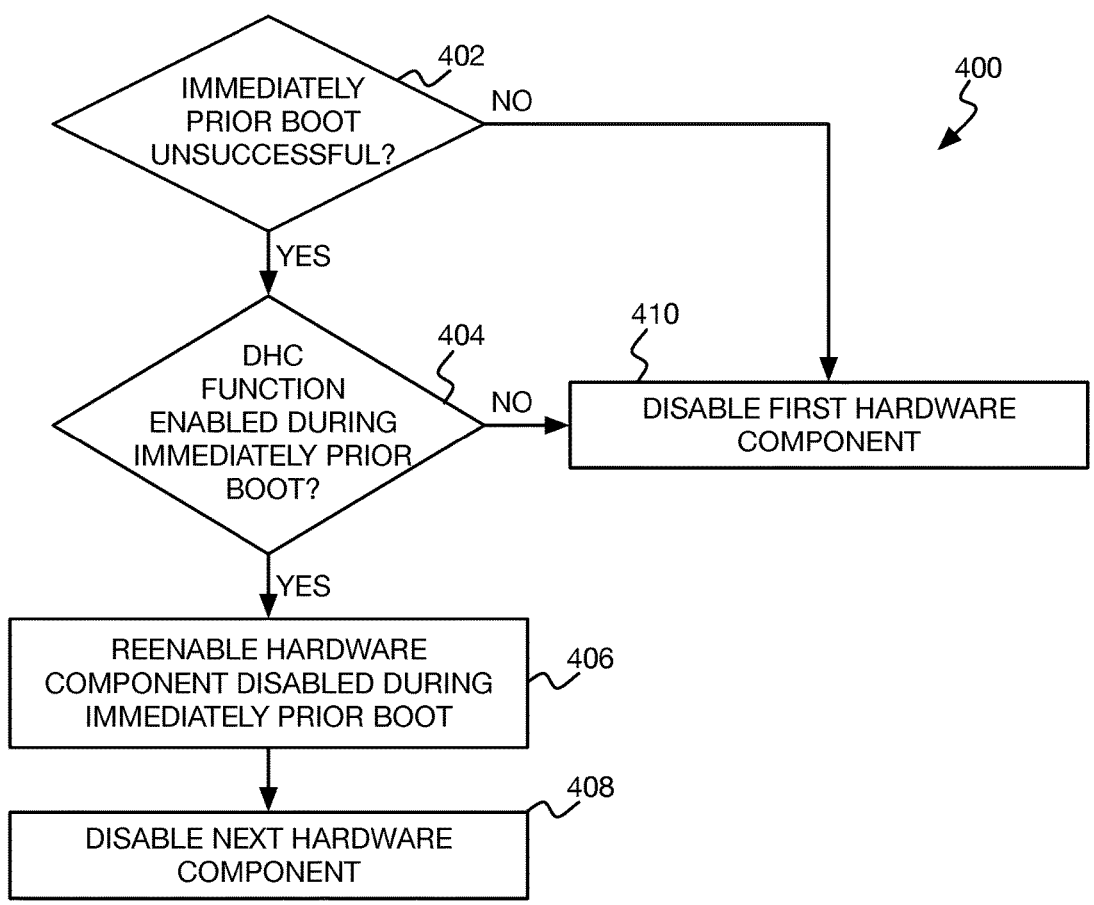
FIGS. 4, 5, and 6 are flowcharts of example methods for configuring hardware components of a computing device according to a DHC.

FIG. 4 shows an example method 400 for configuring the hardware components 114 of the computing device 100 according to a DHC 220. The method 400 can implement part 308 of the method 300, for instance. If the immediately prior boot was unsuccessful (402), and the DHC function was enabled during this prior boot (404), then this means that a hardware component 114 was disabled according to a DHC 220 during the prior boot, which was unsuccessful. Therefore, the disabled hardware component 114 is reenabled (406), and the next hardware component 114 is disabled (408). The next hardware component 114 is the next component 114 of the sequence of hardware components 114 that can be disabled when the DHC function is enabled. By comparison, if the immediately prior boot was successful (402), or if it was unsuccessful but the DHC function was not enabled during this boot (404), then the first hardware component 114 in the sequence is disabled (410).

The effect of the method 400 is that over unsuccessful boots of the computing device 100 with the DHC function enabled, a different hardware component 114 is disabled. For example, when the DHC function is first enabled, the DHC 220 specifies disablement of a first hardware component 114 and enablement of every other component 114. If the computing device 100 does not successfully boot, when boot is again initiated while the DHC function remains enabled, the DHC 220 specifies disablement of a different, second hardware component 114 and enablement of every other component 114 (including the first hardware component 114 that was disabled during the prior, unsuccessful boot). If the computing device 100 still does not boot successfully, if boot is again initiated with the DHC function remaining enabled, the DHC 220 specifies disablement of a different, third hardware component 114 and enablement of every other component (including the first and second hardware components 114 that were previously disabled).

A DHC 220 in this implementation is, therefore, the disablement of one hardware component 114, and the enablement of every other component 114. The DHC 220 is thus a configuration in that it specifies which one hardware component 114 is disabled, and specifies that the components 114 are enabled. The DHC 220 is dynamic in that over consecutive unsuccessful boots with the DHC function enabled, a different hardware component 114 is selected as the disabled component 114.

The two variables that have been described can effectuate the method 400. Testing the counter of the number of consecutive times boot of the computing device 100 has been initiated without a successful boot occurring corresponds to parts 402 and 404 together. If the counter is greater than zero, then the method 400 proceeds to part 406, and otherwise proceeds to part 410. The counter is incremented at the conclusion of performance of the method 400. The pointer is reset to refer to the first hardware component within the sequence in part 410, and is advanced to the next hardware component in the sequence in part 408.

Figure 5:
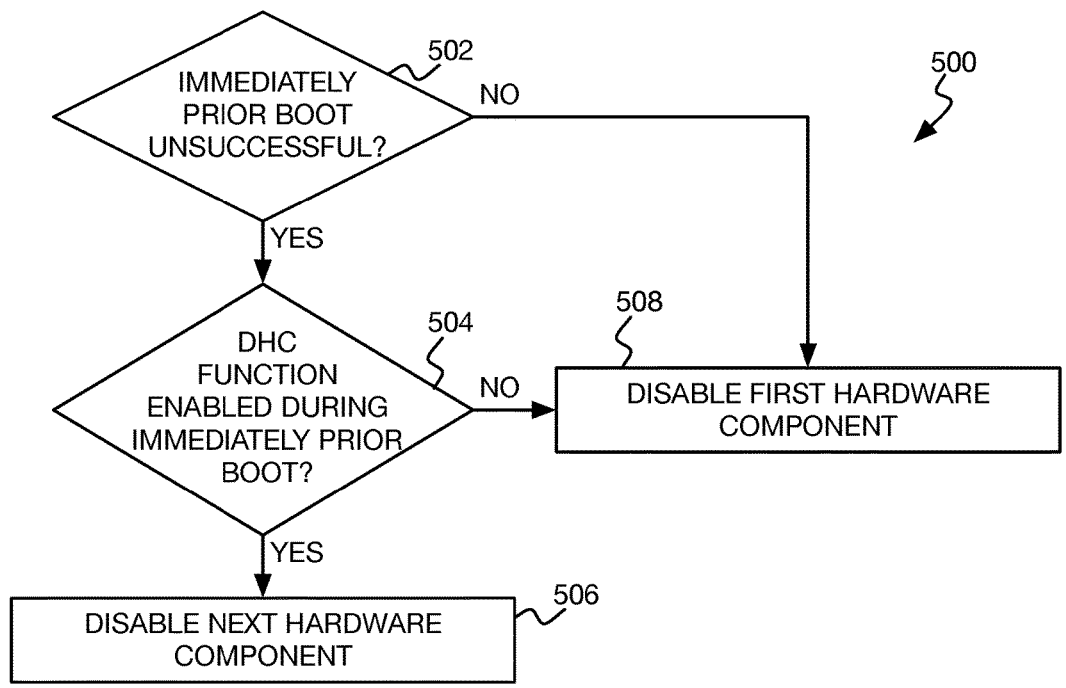

FIG. 5 shows another example method 500 for configuring the hardware components 114 of the computing device 100 according to a DHC 220. The method 500, like the method 400, can implement part 308 of the method 300. If the immediately prior boot was unsuccessful (502), and the DHC function was enabled during this prior boot (504), then this means that a hardware component 114 was disabled according to a DHC 220 during the prior boot, which was unsuccessful. The next hardware component 114 is also disabled (506), while maintaining disablement of every prior hardware component 114 that was disabled. The next hardware component is the next component 114 of the sequence of components 114 that can be disabled when the DHC function is enabled. By comparison, if the immediately prior boot was successful (502), or if it was unsuccessful but the DHC was not enabled during this boot (504), then the first hardware component 114 in the sequence is disabled (508).

The effect of the method 500 is that over unsuccessful boots of the computing device 100 with the DHC function enabled, additional hardware components 114 are disabled in a cumulative manner. For example, when the DHC function is first enabled, the DHC 220 specifies disablement of a first hardware component 114 and enablement of every other component 114. If the computing device 100 does not successfully boot, when boot is again initiated while the DHC function remains enabled, the DHC specifies additional disablement of a different, second hardware component 114, such that a total of two components 114 are disabled, including the first component 114 that was previously disabled. If the computing device 100 still does not boot successfully, if boot is again initiated with the DHC function remaining enabled, the DHC specifies additional disablement of a different, third component 114, such that a total of three components 114 are disabled, including the first and second components 114 that were previously disabled.

A DHC 220 in this implementation is, therefore, the disablement of one or more hardware components 114, and the enablement of the other components 114. The DHC 220 is thus a configuration in that it specifies the hardware component(s) 114 that are to be disabled, and those that are to be enabled. The DHC 220 is dynamic in that over consecutive unsuccessful boots with the DHC function enabled, a different hardware component 114 is selected to also disable, in addition to any other components 114 that have been selected for disablement, in a cumulative manner.

The two variables that have been described can effectuate the method 500 as well. Testing the counter of the number of consecutive times boot of the computing device 100 has been initiated without a successful boot occurring corresponds to parts 502 and 504 together. If the counter is greater than zero, then the method proceeds to part 506, and otherwise proceeds to part 508. The counter is incremented at the conclusion of performance of the method 500. The pointer is reset to refer to the first hardware component with the sequence in part 508, and is advanced to the next hardware component in the sequence between parts 504 and 506.

Figure 6:
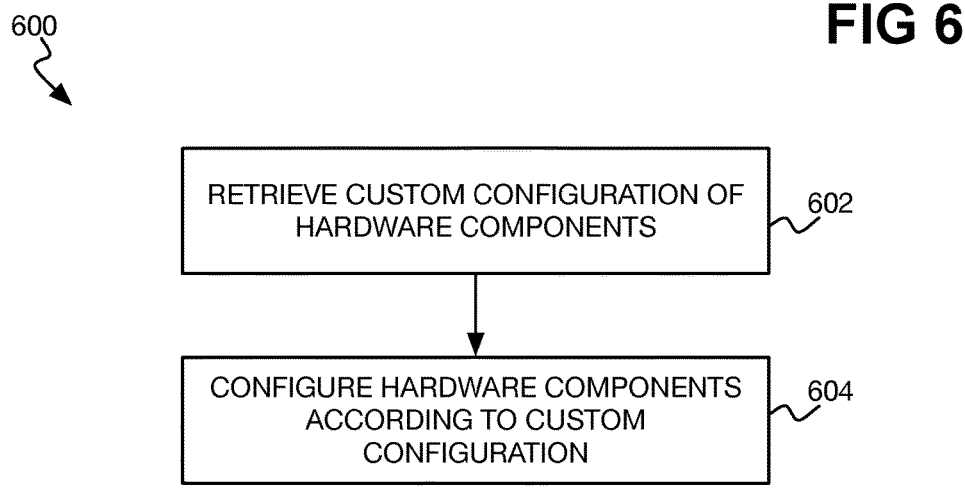

FIG. 6 shows a third example method 600 for configuring the hardware components 114 of the computing device 100 according to a DHC 220, which can implement part 308 of the method 300. The method 600 corresponds to a scenario in which the user enables the DHC function by connecting a removable storage device 120 to the connector 118 of the computing device 100. In the method 600, the removable storage device 120 also stores a custom configuration of the hardware components 114 of the computing device. The method 600 may be used in lieu of the method 400 or the method 500, or in conjunction with the method 400 or the method 500.

The processor 104 in executing the firmware interface 108 retrieves a custom configuration of the hardware components 104 of the computing device 100 that is stored on the removable storage device 120 (602). The removable storage device 120 may store a number of custom hardware component configurations. The custom configurations may be identified by computing device type (e.g., manufacturer and model) or identifier (e.g., serial number). In this implementation, then, the firmware interface 108 retrieves the custom configuration that corresponds to the type of the computing device 100, or its identifier. The removable storage device 120 may store the custom configuration(s) in an encrypted manner for security.

The hardware components 114 of the computing device 100 are configured accordance to the retrieved custom configuration (604). The custom configuration in this respect can have differing levels of granularity. At a high level of granularity, a custom configuration may specify for any hardware component 114 the functionality of the component 114 that is to be disabled, and the functionality that is to remain enabled. At a low level of granularity, a custom configuration may specify which hardware components 114 are to be (or can be) disabled, and which hardware components are to remain enabled. The custom configuration may just identify the hardware components 114 that are to be disabled completely or in part, where all the functionality of other components 114 that are not specified in the custom configuration remain enabled. The custom configuration can specify hardware components 114 by component type, identifier, or in another manner.

The retrieved custom configuration can thus be considered as the DHC 220 in accordance with which the firmware interface 108 configures the hardware components 114. In one implementation, the custom configuration that is retrieved from the removable storage device 120 is the actual DHC 220 according to which the hardware components 114 are configured. In this respect, the custom configuration is dynamic in that the user dynamically specifies which hardware components 114 (or functionality thereof) are to be disabled.

However, in another implementation, the method 600 can be performed in conjunction with the method 400 or the method 500. The custom configuration stored on the removable storage device 120 can specify, in addition to the hardware components 114 that can be disabled, the order or sequence in which these components 114 are to be disabled. Furthermore, the custom configuration can specify whether at any given boot just one hardware component 114 is to be disabled, or whether more than one component 114 can be disabled. This latter specification governs whether the method 400 is performed or whether the method 500 is performed. In the method 400, the hardware components 114 are individually disabled in that at each boot just one component 114 is disabled, whereas in the method 500, the hardware components 114 are cumulatively disabled in that each boot an additional component 114 is disabled.

Performing the method 600 in addition to the method 400 or the method 500 in this respect thus provides for greater user customization. Via the custom configuration stored on the removable storage device 120, the user is able to select which hardware components 114 can be disabled, the order in which they are to be disabled, and whether the method 400 or the method 500 is to be performed. The methods 400 and 500 can each, however, be performed independently of the method 600, such as when the DHC function is automatically enabled, or is enabled in a manner other than via connection of the removable storage device 120 to the connector 118 of the computing device 100.

The techniques that have been disclosed herein provide for a DHC function that when enabled results in a firmware interface of a computing device configuring the hardware components of the computing device according to a DHC. Configuration of the hardware components according to a DHC selectively disables the hardware components, or functionality thereof. Configuration of the hardware components according to a DHC thus selectively custom configures the hardware components. As such, configuration according to the DHC can permit the computing device to successfully boot after a prior unsuccessful boot has occurred, without requiring intervening physical removal of any hardware component.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage drives. It is manifestly intended that this invention be limited only by the claims and equivalents thereof.

We claim:

1. A computer-readable data storage medium that is not a transitory signal storing a firmware interface that a processor of a computing device executes to:
   at initiation of boot of a computing device, detect whether a dynamic hardware configuration (DHC) function has been enabled by determining that a removable storage device is inserted into a port of the computing device and that the removable storage device stores data representing a predetermined signature corresponding to enablement of the DHC function;
   in response to detecting that the DHC function has been enabled, configure hardware components of the computing device according to a DHC; and
   after configuring the hardware components according to the DHC, boot the computing device.

2. The computer-readable data storage medium of claim 1, wherein the DHC selectively disables the hardware components of the computing device,
   wherein responsive to enablement of the DHC function, the processor is to execute the firmware interface to configure the hardware components according to the DHC to successfully boot the computing device after a prior unsuccessful boot of the computing device occurred, without requiring physical removal of any hardware component from the computing device for successful boot of the computing device to occur.

3. The computer-readable data storage medium of claim 1, wherein the DHC selectively custom configures the hardware components of the computing device,
   wherein responsive to enablement of the DHC function, the processor is to execute the firmware interface to configure the hardware components according to the DHC to successfully boot the computing device after a prior unsuccessful boot of the computing device occurred, without requiring physical removal of any hardware component from the computing device for successful boot of the computing device to occur.

4. The computer-readable data storage medium of claim 1, wherein the processor executes the firmware interface to further:
   in response to detecting that the DHC function has not been enabled, permit the hardware components to remain in a default configuration.

5. The computer-readable data storage medium of claim 1, wherein the processor executes the firmware interface to configure the hardware components according to the DHC by:
   retrieving a custom configuration of the hardware components from the removable storage device; and
   configuring the hardware components according to the retrieved custom configuration.

6. The computer-readable data storage medium of claim 5, wherein the custom configuration comprises:
   identification of selected hardware components that are to be disabled.

7. The computer-readable data storage medium of claim 6, wherein the custom configuration comprises:
   an order of the selected hardware components that are to be individually disabled after consecutive unsuccessful boots of the computing device,
   wherein at any boot of the computing device responsive to the DHC function having been enabled, just one selected hardware component is disabled.

8. The computer-readable data storage medium of claim 6, wherein the custom configuration comprises:
   an order of the selected hardware components that are to be cumulatively disabled after consecutive unsuccessful boots of the computing device,
   wherein at any boot of the computing device responsive to the DHC function having been enabled, any previously disabled hardware component of the computing device remains disabled.

9. The computer-readable data storage medium of claim 5, wherein the custom configuration comprises:
   identification of selected hardware components;
   for each selected hardware component, identification of selected functionality thereof that is to be disabled,
   wherein functionality of each selected hardware component other than the selected functionality remains enabled.

10. The computer-readable data storage medium of claim 1, wherein the processor executes the firmware interface to configure the hardware components according to the DHC by:
   selecting a hardware component of the computing device that is currently enabled; and
   disabling the selected hardware component.

11. The computer-readable data storage medium of claim 10, wherein the hardware component is a first hardware component, and wherein the processor executes the firmware interface to configure the hardware components according to the DHC by further:
   determining that a second hardware component of the computing device was disabled by the processor executing the firmware interface during configuration according to the DHC prior to a last unsuccessful boot of the computing device; and
   in response to determining that the second hardware component was disabled by the processor executing the firmware interface during the configuration according to the DHC prior to the last unsuccessful boot, reenabling the second hardware component.

12. The computer-readable data storage medium of claim 10, wherein the hardware component is a first hardware component, and wherein the processor executes the firmware interface to configure the hardware components according to the DHC by further:

maintaining disablement of any other hardware component of the computing device that processor executing the firmware interface previously disabled during configuration according to the DHC before any prior unsuccessful boot of the computing device.

13. A computing device comprising:
a mainboard;
a processor connected to the mainboard;
a plurality of hardware components, other than the processor, connected to the mainboard;
a non-volatile memory of the mainboard storing a firmware interface executable by the processor to:
at initiation of boot of the computing device, detect whether a dynamic hardware configuration (DHC) function has been enabled;
in response to detecting that the DHC function has been enabled, configure the hardware components according to a DHC by:
selecting a hardware component of the computing device that is currently enabled;
disabling the selected hardware component;
determining that a second hardware component of the computing device was disabled by the processor executing the firmware interface during configuration according to the DHC prior to a last unsuccessful boot of the computing device; and
in response to determining that the second hardware component was disabled by the processor executing the firmware interface during the configuration according to the DHC prior to the last unsuccessful boot, reenabling the second hardware component; and
after configuring the hardware components according to the DHC, boot the computing device.

14. The computing device of claim 13, wherein the firmware interface is one of:
a basic input/output system (BIOS);
a unified extensible firmware interface (UEFI).

15. The computing device of claim 13, wherein the DHC selectively disables the hardware components,
wherein responsive to enablement of the DHC function, the processor is to execute the firmware interface to configure the hardware components according to the DHC to successfully boot the computing device after a prior unsuccessful boot of the computing device occurred, without requiring physical removal of any hardware component from the computing device for successful boot of the computing device to occur.

16. The computing device of claim 13, wherein the DHC selectively custom configures the hardware components,
wherein responsive of the enablement of the DHC function, the processor is to execute the firmware interface to configure the hardware components according to the DHC to successfully boot the computing device after a prior unsuccessful boot of the computing device occurred, without requiring physical removal of any hardware component from the computing device for successful boot of the computing device to occur.

17. A method comprising:
enabling a dynamic hardware configuration (DHC) function of a computing device by inserting a removable storage device storing data representing a predetermined signature corresponding to enablement of the DHC function into a port of the computing device; and
after enabling the DHC function, initiating boot of the computing device,
wherein at initiation of the boot of the computing device, a processor of the computing device executes a firmware interface, detects that the DHC function has been enabled by detecting that the removable storage device stores the predetermined signature, and responsively configure hardware components of the computing device according to a DHC, and then boot the computing device.

* * * * *